April 22, 1958     R. J. CANTWELL     2,832,021
MULTIPLE SHAFT ROTATION SERVO SYSTEM
Filed Dec. 29, 1954     4 Sheets-Sheet 2

INVENTOR.
ROBERT J. CANTWELL
BY
ATTORNEY

April 22, 1958   R. J. CANTWELL   2,832,021
MULTIPLE SHAFT ROTATION SERVO SYSTEM Filed Dec. 29, 1954   4 Sheets-Sheet 3

INVENTOR.
ROBERT J. CANTWELL
BY
ATTORNEY

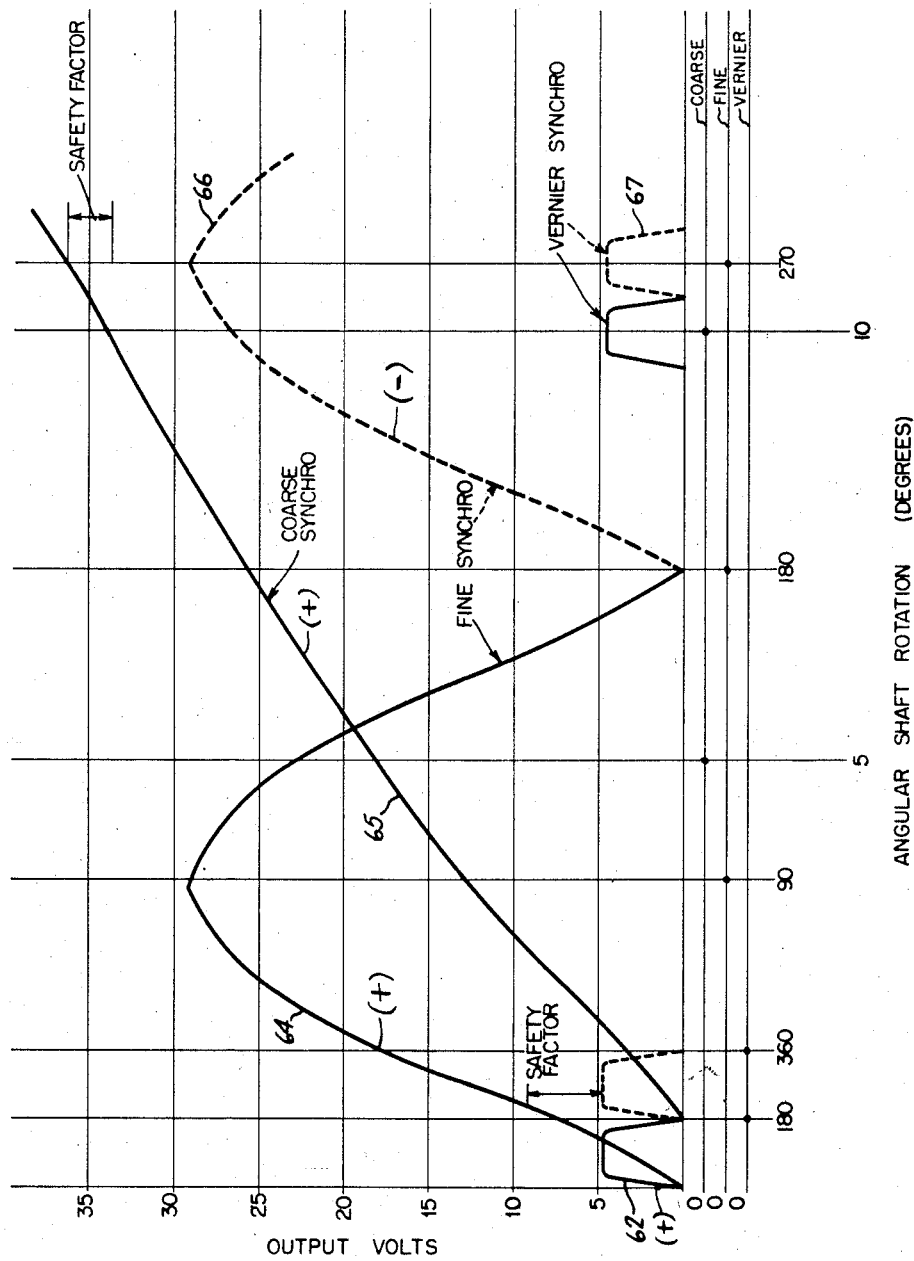

United States Patent Office 2,832,021
Patented Apr. 22, 1958

2,832,021
MULTIPLE SHAFT ROTATION SERVO SYSTEM

Robert J. Cantwell, Johnson City, N. Y., assignor to International Business Machines Corporation, New York, N. Y., a corporation of New York Application December 29, 1954, Serial No. 478,460

6 Claims. (Cl. 318—30)

This invention is concerned generally with a servo, and more specifically with a self-synchronous type of servo system.

The self-synchronous servo system according to this invention is one employing rotary electrical machines known as synchros or the like, and involving the use of a plurality of such synchros geared together so as to form a number of channels in transmitting the electrical signals for having a remote servo-type operation. The system herein disclosed employs three channels for transmitting the control information of the servo system.

In certain applications it is desirable to have a shaft which may be rotated a large number of revolutions, followed exactly at a remote point by a similar shaft that will reproduce the revolutions, without any ambiguity in the position of the remote shaft. In other words, in certain applications it is of utmost importance that a remote shaft be positioned in a corresponding manner to a control shaft and without any possibility of an ambiguity between the final relative positions of such shafts. Such ambiguity might be introduced in the usual servo system if a power failure should occur in the electrical portion of the system, because the remote shaft might be rotated a complete revolution or more during such power failure. Then, following a restoration of the electrical power, the remote shaft would be synchronized at a new position that would differ by a given number of complete revolutions from the position of the controlling shaft. It is to avoid such difficulty that a servo according to this invention may be employed.

In other applications of servo systems, it is desirable to have a first shaft that may be rotated through one or more revolutions and a second shaft which will precisely follow the first shaft, in so far as angular position to a fine degree is concerned.

An object of this invention is to provide an improved multispeed channel system for a servo using signal generators, control transformers and circuit elements for combining the outputs of the control transformers in a manner that will allow the use of three or more speeds while maintaining continuous control in switching from one speed to the next.

Another object is to provide a selector circuit for use in a plural speed channel servo having three or more channels and employing non-linear impedance elements for effectively combining the signals from all three channels in creating an error signal that has its effective source shifted from one channel to the next without reversal in the sense of the error signal.

Another object of this invention is to provide a three-speed servo system for enabling the positioning of a remote shaft to be maintained accurate and without ambiguity over a large number of revolutions in either direction.

Briefly, this invention includes an electric servo system for positioning a remote shaft to a corresponding position relative to an input shaft, without any ambiguity, over a predetermined large number of revolutions. The system includes three A. C. signal generators, each having a stator and a rotor, with said rotors geared together to create a coarse, a fine and a vernier signal generator. The system also including three control transformers, each having a stator and a rotor with their rotors geared together in the same ratio as said signal generators to create corresponding coarse, fine and vernier signal transformers. Also included in the system is means for applying an excitation voltage to said signal generators, and means for electrically connecting corresponding generators and transformers together to provide an electrical link between said input shaft and said remote shaft. In addition, the system includes a servomotor for driving said remote shaft, said motor being mechanically connected to said control transformer rotors and having an input circuit electrically connected thereto. The system further includes circuit means for connecting the outputs of said transformers to said servomotor input, including non-linear resistance means for variably limiting said transformer output signals, in order to shift control from one to the other of said three transformers, all so as to insure against ambiguity in the final position of said remote shaft.

A specific embodiment of the invention is described below, and illustrated in the drawings, in which like reference numbers refer to like parts throughout and wherein:

Fig. 6 is a graph showing signal amplitude plotted against relative shaft rotation and illustrating the action of the three channels in the servo system.

Figure 1:
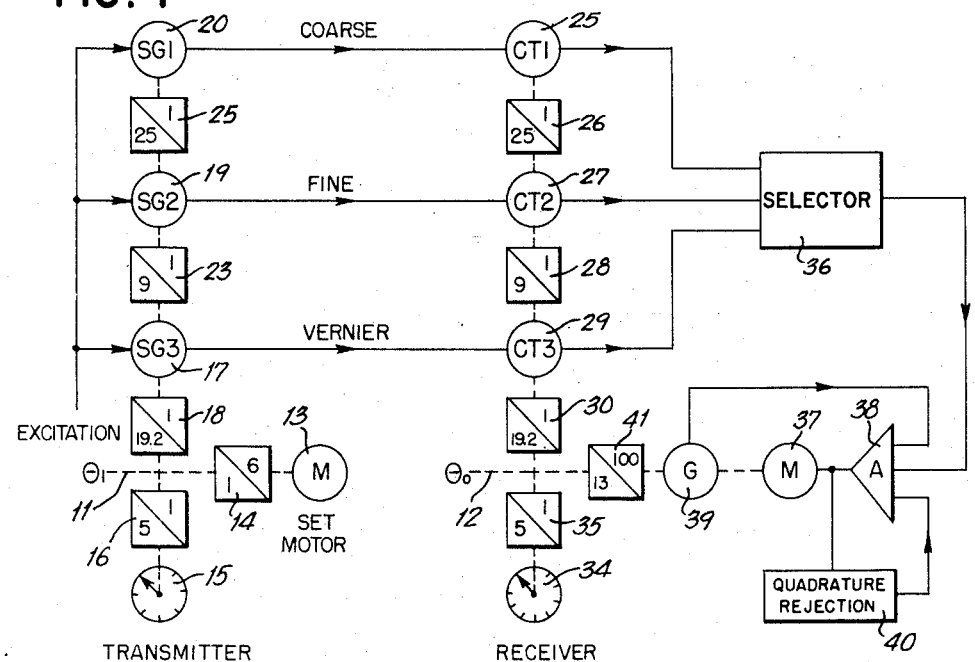
Fig. 1 is a schematic diagram illustrating the complete servo system according to this invention.

Referring to Fig. 1 it will be observed that the system according to this invention includes an input shaft 11 indicated schematically by a dashed line marked "$\theta_i$" and an output shaft 12 similarly indicated schematically by a dashed line marked "$\theta_o$." The input shaft 11 is to be rotated a large number of revolutions, and consequently there is included a set motor 13 that is connected to input shaft 11 through reduction gearing 14 which may have any ratio as desired, but which is illustrated as being a 6:1 gear reduction.

Also connected to the input shaft 11 there is an indicator 15 which is geared to the input shaft 11 with a 5:1 gear reduction as indicated by a box 16 in the drawing. This indicator therefore will subdivide any given revolution of the input shaft in a 5:1 ratio.

The rotational position of input shaft 11 may be determined manually or by means of the set motor 13, and as rotated, it drives the rotor of a synchro 17 (that is marked "SG3" to indicate its use as a signal generator). There is a gear reduction between the input shaft 11 and the rotor of synchro 17 in the ratio of 19.2:1 as illustrated by a box 18. Connected mechanically to the rotor of signal generator 17 there are two additional signal generators, or synchros, 19 and 20 that are designated "SG2" and "SG1," respectively. These signal generators 19 and 20 have their rotors connected by gear reduction trains as indicated by a box 23 between the rotor of signal generator 17 and that of signal generator 19, and also by a gear reduction box 24 having a ratio of 25:1 that is located between signal generator 19 and signal generator 20.

At the receiver end of the servo system there are corresponding synchros that have their rotors geared together with the same ratios as were the synchros being employed as signal generators, at the transmitter end of the system. Still referring to Fig. 1, there is a coarse synchro 25 that is marked "CT1" since it is being employed as a control transformer. The rotor of synchro 25 is geared in a 1:25 ratio as indicated by a box 26 to the rotor of a fine synchro 27. Synchro 27 in turn has its rotor geared by a gear ratio of 1:9 as indicated by a box 28, to the rotor of a vernier synchro 29. The rotor of the vernier synchro, or control transformer 29, is connected by a gear ratio of 1:19.2 as indicated by a box 30, to the output shaft 12. Also connected to the output shaft 12 there is another indicator 34 that is similar to the indicator 15 at the transmitter end of the system. This indicator 34 is connected to the output shaft 12 by a gear ratio of 5:1 as indicated by a box 35.

The transmitter and receiver ends of the servo system are connected together electrically as generally indicated in Fig. 1 and as shown in greater detail and described below in connection with Fig. 2. In the electrical system there is a selector circuit which is indicated in Fig. 1 by a box 36. The electrical system feeds signals from the selector circuit 36 to a servomotor 37 via an amplifier 38. There is included in this electrical system other conventional elements, such as a tachometer generator 39 and a quadrature rejection network 40. The servomotor 37 is directly connected to drive the output shaft 12 by means of a gear reduction indicated by box 41, which in this instance has a gear ratio of 100:13.

It will be noted that the servo system as illustrated in Fig. 1 is one in which the input shaft 11 may rotate a large number of revolutions before the shaft of the coarse signal generator 20 rotates once. Consequently the system enables a faithful reproduction of the rotations of input shaft 11 to be created at the output shaft 12 by means of the corresponding control transformers 25, 27 and 29 in such a manner that the exact number of revolutions, which input shaft 11 makes, must be completed also by the output shaft 12, in order to create a null or no signal condition in the circuit that energizes the servomotor 37. For this reason the output shaft 12 cannot have any ambiguity in its zero error, or no signal, position so long as the coarse synchros, i. e. signal generator 20 and control transformer 25, have not been rotated beyond a half revolution in either direction relative to one another. In this manner it is pointed out that with a system employing gear ratios as illustrated, the transmitter may be rotated in either direction for 2160 turns without creating the possibility of an ambiguity between input shaft 11 and output shaft 12, after the error signal in the system has been returned to zero. It will be appreciated that such a system is particularly valuable in an application where the revolutions of a remotely controlled shaft must be accurately counted for a large number of turns, and the exact number of turns made must not deviate from the number which was given to an input shaft located remotely from the remote control output shaft.

Figure 2:
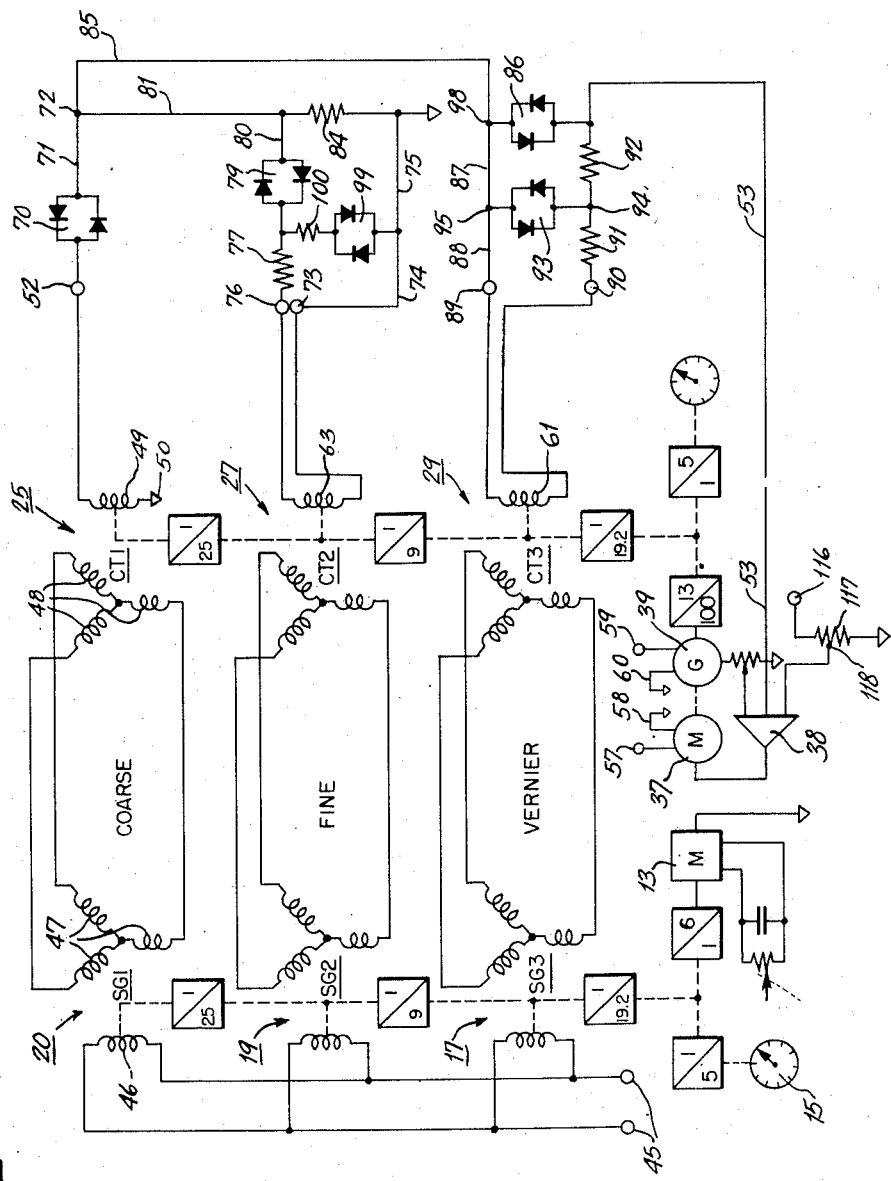
Fig. 2 is a more detailed circuit diagram of the entire servo system.

In Fig. 2 a more detailed showing of the electrical circuit involved is made. The circuitry for the six synchros need not be discussed in detail since the electrical circuits involved are conventional for each of the three channels. Such synchro circuits may be found in a large number of issued patents which employ electrical servo systems using synchros both as signal generators and control transformers, to obtain an error signal from the control transformer that will energize a motor to cause it to rotate the rotor of the control transformer in the proper direction and amount so as to reduce the error signal there created to zero or a minimum, and thereby stop the motor with the rotor of the control transformer in a given position.

Briefly, a circuit may be traced. Choosing the coarse channel, it will be observed that there are a pair of excitation input terminals 45, for receiving an A. C. excitation voltage that is directly applied to a rotor winding 46 of the coarse signal generator 20. The signal generator 20 has the usual three Y-connected windings 47, that are connected directly and respectively to corresponding Y-connected windings 48 on the control transformer 25. Control transformer 25 has a rotor winding 49 that has one of its output lead wires connected to a ground point 50. The other lead from rotor winding 49 is directly connected to a terminal 52. The error signal that is generated in rotor winding 49 will be fed to the terminal 52, and then via a selector circuit (to be described in more detail below) to a wire 53 that leads to the amplifier 38. This being the same amplifier as illustrated in Fig. 1.

The motor 37 might be one of a number of different types of motor, but in the system illustrated, it is preferable to employ a two-phase A. C. motor having one phase directly excited by a constant voltage supply, as indicated by the circuit including a terminal 57 and a ground lead 58. The other, or control, phase winding (not shown) of the motor is energized from the output of the amplifier 38, and consequently the motor will reverse in direction as the error signal introduced from the output of the amplifier 38 reverses in phase. The tachometer generator 39 is a conventional element, and has a field winding that is constantly excited by means of the illustrated circuit including a terminal 59 and a grounded lead 60. The output of the tachometer generator is fed into the amplifier 38 in a degenerative manner for stability, as is conventional in this type of servo system.

It is pointed out that the operation of the servo according to this invention, which employs three separate speed channels, is made practical by reason of the selector circuit, that is now to be described. By means of employing non-linear resistors the relationship of the error signal voltages as generated in the rotor windings of the three control transformers may be controlled to have a particular relationship, which is illustrated in Fig. 6. Referring to Fig. 6, it will be noted that when an error signal is created by reason of a difference between the shaft positions of the various synchros, the signal created in a rotor winding 61 (Fig. 2) of the vernier control transformer, will be a voltage having an amplitude as represented by a curve 62 illustrated in Fig. 6. Likewise, the error voltage generated in the fine synchro channel will be produced in a rotor winding 63 (Fig. 2) of the fine control transformer 27, and the amplitude voltage there generated is illustrated by a curve 64 in Fig. 6. Finally, the voltage generated in coarse control transformer 25 is that produced in rotor winding 49 which has its voltage amplitude represented by a curve 65 in Fig. 6. It is pointed out that by reason of the gear ratios connecting the three rotors of the control transformers 25, 27 and 29, the amplitude curves 65, 64 and 62 respectively of the error signals generated in these three transformers, will go through zero amplitude and become negative in a relative manner as indicated by the three scale factors for the rotor displacements in each channel. This is indicated in Fig. 6 by the three different scales along the abscissa of the curve. It will be observed that the vernier rotor will turn through 360° before the fine channel transformer has turned even 45°. It will also be observed that the amplitudes of the voltages created are so related that even though the vernier control transformer should make more than one complete revolution relatively to the rotor of the vernier signal generator 17, so that its signal would be reversed at 180° and become negative; the signal that is at the same time generated in the rotor 63 of the fine channel becomes sufficiently great to more than overcome the effect of a negative signal generated in the vernier winding 61. This is illustrated by the safety factor indicated at the left lower corner in Fig. 6, which illustrates the voltage available to prevent false nulls. In the absence of this safety factor, false nulls might be produced; i. e., the motor would stop, thereby stopping the rotors of the control transformers such that a false null would result. Unless the rotors move, the voltage output therefrom does not change. In like manner, should the control transformer of the fine channel be rotated beyond 180° relative to the rotor of its signal generator 19, this still would not cause a negative signal (reverse-phase A. C. signal) to be produced at the input of the amplifier 38, because the error signal introduced by means of the rotor winding 49 of the coarse control transformer will have become sufficiently large in amplitude to more than offset the maximum negative error signals of both the fine control transformer and the vernier control transformer together. This situation is illustrated in Fig. 6 where the dash-line curve 66 for the fine channel and a similar dash-line curve 67 for the vernier channel may both be added together and still be less than the positive signal as shown by the curve 65, which is generated in control transformer winding 49 of the coarse channel. It will be understood that the dash-line curves shown in Fig. 6 represent the negative voltages which would extend below the zero line of the ordinates, but which are represented above as dash lines to indicate the relationship between their amplitudes and the amplitude of the positive signal voltages with which they are being compared.

It is pointed out that the shaft rotation that is referred to herein, and which is the quantity plotted along the abscissa of the curves of Fig. 6, is a relative rotation between the rotors of the signal generator synchro and the control transformer synchro for each channel. This is a well-known phenomenon for a servo system of this type and need not be discussed further.

The means for accomplishing the error signal amplitude relationship described above in connection with Fig. 6 is shown in detail in Fig. 2 where it may be observed that there are a number of limiters which each consists of a pair of rectifiers connected back to back. This arrangement provides a non-linear resistance effect so that the desired conditions in relationships among the signals as generated in the three channels may be effectuated. These rectifiers may be various types but it is preferred to employ a pair of selenium rectifiers in each of the limiters.

Referring to Fig. 2 it will be observed that the rotor winding 49 of the coarse-control transformer 25 is directly connected to a terminal 52 from one end of the winding while the other end thereof is grounded. Also connected to terminal 52 there is a limiter 70 that is connected in parallel with the output of the fine channel, by means of a wire 71 that is connected to a junction point 72. The fine-control transformer 27 has its rotor winding 63 connected to ground at one end thereof via a terminal 73 and wires 74 and 75. The other end of winding 63 is connected to terminal 76, that has directly connected thereto one end of a resistor 77. The other end of resistor 77 is directly connected to one side of a limiter 79, the other side of which is connected directly to the junction point 72, via wires 80 and 81. In this manner the coarse and fine channels are connected in parallel across a load resistor 84 that has one end thereof connected to the junction point 72, via the wire 81, and the other end connected to ground as illustrated. In series with the parallel connected coarse and fine channels is the vernier channel which is fed by the error signal generated in the rotor winding 61 of vernier-control transformer 29. This error signal is fed in series with the combined parallel connected error signals from windings 49 and 63, by means of the circuit shown which includes a wire 85 that leads from the junction point 72 to one side of a limiter 86, and which continues via a wire 87 and a wire 88 to a terminal 89 that is directly connected to one end of the winding 61. The other end of winding 61 is directly connected to a terminal 90, that has connected thereto one end of a resistor 91, the other end of which is connected to one end of another series resistor 92. The other end of resistor 92 is connected via the wire 53 to the input of amplifier 38.

It will be noted that there is another limiter 93 that is connected in shunt across the vernier-control transformer rotor winding 61 also. Thus, there is connected in series with the rotor winding 61, two resistors 91 and 92, while connected in shunt with the winding 61 there are two limiters 93 and 86. The limiter 93 has one side thereof connected to a common point 94 located between the series-connected resistors 91 and 92, while the other side of limiter 93 is connected to a junction point 95 that joins the wires 87 and 88. Similarly, limiter 86 is connected in shunt across the winding 61 by means of having one side thereof connected to a junction point 98 that joins wires 85 and 87, while the other side of the limiter is connected to the wire 53 that is connected directly to one end of resistor 92.

It is particularly pointed out that the output circuits for coarse and fine rotor windings 49 and 63 are connected together in parallel across a load resistor 84, while the vernier rotor winding 61 is connected in series with this same load resistor 84 and the input circuit for the amplifier 38.

The operation of the various limiters in the circuit just described will be clear upon an inspection of the signal amplitude graph shown in Fig. 6. It is shown that the signal generated in the vernier rotor winding 61, as shown by curve 62 in Fig. 6, is rather sharply limited in amplitude to less than five volts by reason of the shunting action of limiters 86 and 93 in conjunction with the series-connected resistors 91 and 92. However, the coarse-control transformer channel, rotor winding 49 has its output signal limited at its inception rather than in its amplitude so that the amplitude remains substantially zero by reason of the limiter 70 being in series with the winding 49, until the coarse control transformer rotor has rotated between one and two degrees. Consequently, while the signal generated in transformer winding 61 rises sharply to a maximum, it is cut off quite early from continuing above a given amplitude; and the signal generated in coarse-transformer winding 49 is held back so as not to appear until after a given output from the winding 49 has been created.

Between these two extremes, the fine-transformer winding 63 has its signal controlled by a combination of the two effects so that it is at first inhibited from a rapid rise by means of the limiter 79, but following a given amplitude signal having been reached in the winding 63, the slope of the curve is increased until a given greater amplitude is reached where the action of a limiter 99 and series resistor 100 comes into play. These then limit the fine signal to something less than 30 volts.

It will be noted that the resistor 100 is connected in series with the limiter 99 and together they are connected in shunt across the rotor winding 63 of the fine-control transformer. Consequently the action of the fine channel provides a transition signal for maintaining the proper direction error signal in between the periods when the vernier and the coarse signals maintain the proper direction of polarity of the error signal. This situation has been discussed above in connection with the signal relationships illustrated in Fig. 6.

Figure 3:
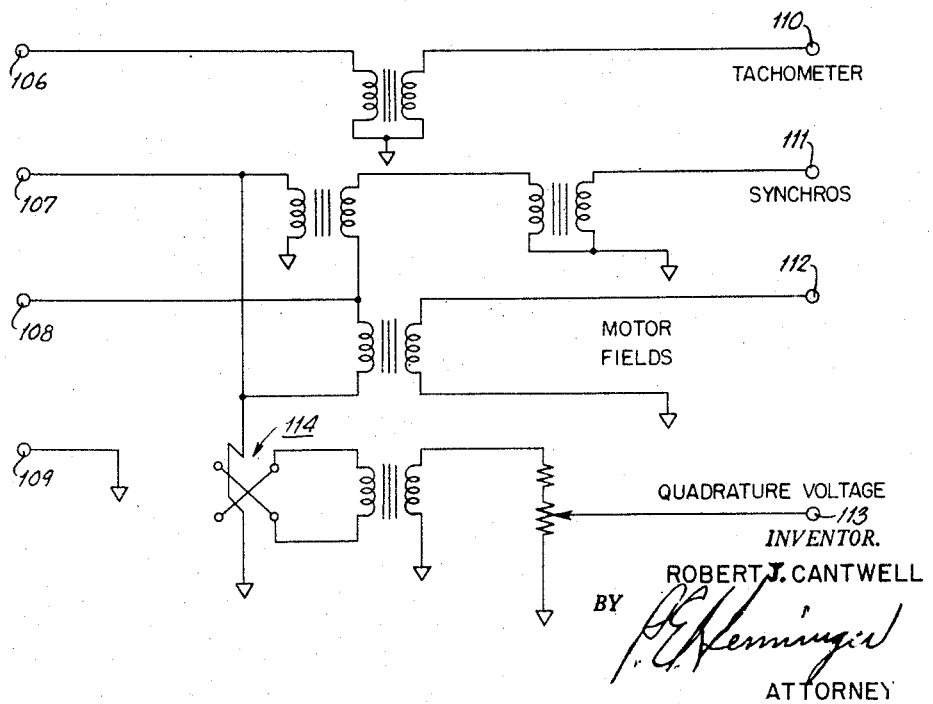
Fig. 3 is a circuit diagram showing the excitation circuits for the various elements of the servo system.

Fig. 3 illustrates a conventional circuit for providing excitation voltages to be employed in the servo system as shown in Fig. 2. There are four terminals 106, 107, 108 and 109 that will have connected thereto a conventional three-phase Y-connected source of A. C. voltage. The neutral of this circuit is connected to terminal 109 which is grounded as illustrated. The other three phases of the supply are connected to the terminals 106, 107, and 108 which have transformer windings connected across these three phases, as illustrated. The secondaries of these transformers have three terminals 110, 111 and 112 connected thereto as illustrated. This arrangement is conventional and provides a means for obtaining excitation as indicated for the tachometer, for the transmitter synchros 17, 19 and 20, and for the motor fields of servo motor 37 (as well as the set motor 13) respectively. In addition, there is a quadrature voltage terminal 113, that has a voltage produced thereat which is in quadrature with the excitation voltage for the synchros that is provided at the terminal 111. This quadrature voltage is produced from the three-phase supply in a conventional manner and the circuit includes a reversing switch 114 for reversing the phase of the quadrature voltage in order to provide the proper quadrature as necessary in cancelling quadrature components that are a disturbing influence in the control signals which are fed into the servo amplifier 38.

Thus, it will be appreciated that the excitation for the system shown in Fig. 2 may be had by the circuit shown in Fig. 3, when a three-phase supply is connected to the four terminals 106–109 and the output terminals of the excitation network are connected as follows: Terminal 110 is connected to the terminal 59 of Fig. 2 in order to excite the tachometer generator 39. The terminal 111 is connected to one of the terminals 45 of Fig. 2 while the other terminal thereof will be grounded. The terminal 112 is connected to the terminal 57 of Fig. 2 in order to excite one winding of the servomotor 37. Likewise, an excitation circuit (not shown) for the set motor 13 will be connected to terminal 112. The terminal 113 is connected to a terminal 116 in Fig. 2, which has a potentiometer resistor 117 connected thereto that has the other side thereof connected to ground. There is a tape connection 118 on the potentiometer resistor 117 which is connected to an input of the amplifier 38 so as to provide the quadrature voltage input in a predetermined desired amplitude for canceling undesired quadrature components from the error signals as introduced to the amplifier 38 from the control transformers.

Figure 5:
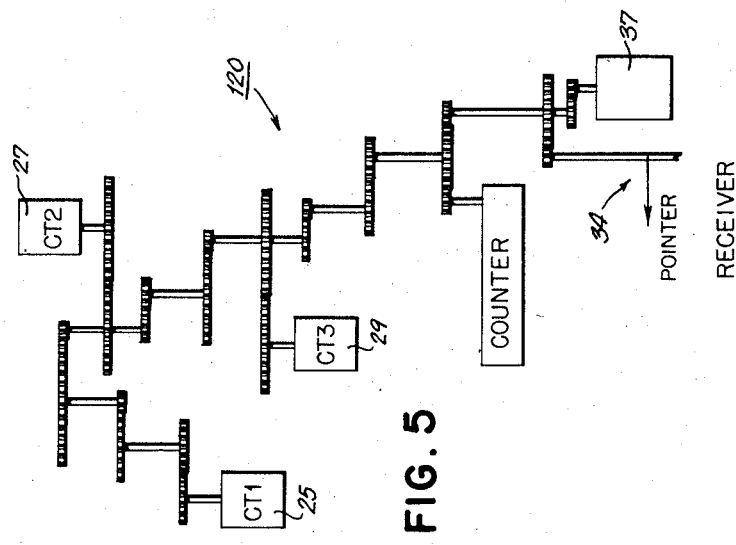
Figs. 4 and 5 illustrate the mechanical gearing connections involved, at the transmitter and receiver ends of the servo system respectively.
Figure 4:
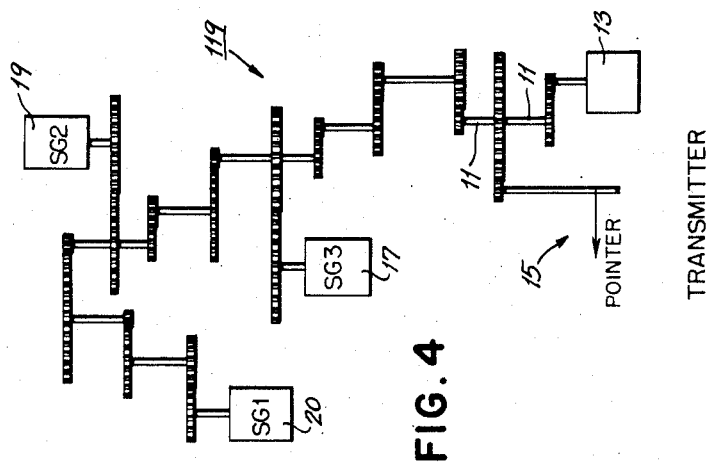

Figs. 4 and 5 merely illustrate the mechanical connections and gearing between the various elements of the transmitter and receiver ends respectively for the servo system. It will be observed that in Fig. 4 there is a train of gears 119 which interconnects the various rotative elements including the set motor 13, the indicator 15 and the three signal generators 17, 19 and 20. In like manner, the corresponding elements at the receiver end of the system are illustrated in Fig. 5 where there is a gear train 120 that illustrates the mechanical interconnection among the various rotative elements including servo motor 37, indicator 34 and the three control transformers 29, 27 and 25.

While there has been illustrated and described in some detail a particular embodiment of the invention in accordance with the applicable statues, this is not to be taken as in any way limiting the invention, but merely as being descriptive thereof.

It is claimed:

1. A plural-speed servo system comprising at least three speed channels directly connected together for preventing ambiguity in rotational positions of multirevolution input and output shafts, wherein the highest speed error signal channel of said three speed error signal channels is connected electrically in series with a parallel connection of the two lower speed channels.

2. In a multiple shaft rotation servo system having a plurality of channels for preventing ambiguity, the combination comprising a coarse channel, a fine channel and a vernier channel, a servo motor for receiving control signals from said three channels, and circuit means for combining the signals from said three channels including non-linear impedance means for shifting control of the motor from one channel to the next, said coarse and fine channels being connected in parallel, and said vernier channel being connected in series with the parallel connected coarse and fine channels.

3. An electric servo system for positioning a remote shaft to a corresponding position relative to an input shaft without ambiguity over a predetermined large number of revolutions comprising three A. C. signal generators, each having a stator and a rotor with said rotors geared together to create a coarse, a fine and a vernier signal generator; three control transformers each having a stator and a rotor with their rotors geared together in the same ratio as said signal generator rotors to create corresponding coarse, fine and vernier transformers; means for applying an excitation voltage to said signal generators; means for electrically connecting corresponding generators and transformers together to provide an electrical link between said input shaft and said remote shaft; a servomotor for driving said remote shaft; said motor being mechanically connected to said control transformer rotors and having an input circuit; and circuit means for connecting the outputs of said transformers to said servomotor input, including the output of said vernier transformer in series with the parallel connected coarse and fine transformers.

4. An electric servo system for positioning a remote shaft to a corresponding position relative to an input shaft without ambiguity over a predetermined large number of revolutions comprising three A. C. signal generators each having a stator and a rotor with said rotors geared together to create a coarse, a fine and a vernier signal generator; three control transformers each having a stator and a rotor with their rotors geared together in the same ratio as said signal generator rotors to create corresponding coarse, fine and vernier transformers; means for applying an excitation voltage to said signal generators; means for electrically connecting corresponding generators and transformers together to provide an electrical link between said input shaft and said remote shaft; a servomotor for driving said remote shaft; said motor being mechanically connected to said control transformer rotors and having an input circuit; a circuit for connecting the outputs of said transformers to the input of said servomotor including a load resistor; and a circuit for the vernier transformer having two series resistors and two shunt connected limiters; said vernier circuit being connected in series with parallel connected circuits for the fine and coarse transformers; said fine transformer circuit having a series resistor, a series limiter and a shunt circuit including a resistor in series with a limiter; said coarse transformer circuit having a series limiter.

5. The invention according to claim 4 wherein said limiters comprise a pair of selenium rectifiers connected back to back to form nonlinear resistance elements.

6. In an electric servo system for positioning a remote shaft to a corresponding position relative to an input shaft, said system having at least three signal generators each having a stator and a rotor with said rotors geared together to create a predetermined ratio therebetween; at least three control transformers each having a stator and a rotor with their rotors geared together in the same ratio as said signal generator rotors; means for applying an excitation voltage to said generators; means for electrically connecting corresponding generators and transformers together to provide an electrical link between said input shaft and said remote shaft; a servomotor for driving said remote shaft; said motor being mechanically connected to said control transformer rotors and having an input circuit; and circuit means for connecting the outputs of said transformers to said servomotor input, including the output of said highest speed transformer connected in series with the parallel outputs of said lower speed transformers.

References Cited in the file of this patent

UNITED STATES PATENTS

| | | |
|---|---|---|
| 1,559,524 | Hewlett et al. | Oct. 27, 1925 |
| 2,455,364 | Hays | Dec. 7, 1948 |
| 2,560,337 | Fouassin | July 10, 1951 |
| 2,670,456 | Naylor et al. | Feb. 23, 1954 |